United States Patent [19]

Brodribb et al.

[11] 4,349,977
[45] Sep. 21, 1982

[54] AUTOMATIC FISHING APPARATUS

[75] Inventors: Marcus T. Brodribb, Currie; Antony G. Brodribb, Triabunna, both of Australia

[73] Assignee: King Reel Proprietary Limited, Tasmania, Australia

[21] Appl. No.: 127,090

[22] Filed: Mar. 4, 1980

[30] Foreign Application Priority Data

Feb. 1, 1980 [AU] Australia .............................. PE2211

[51] Int. Cl.³ .......................................... A01K 89/017
[52] U.S. Cl. ................................... 43/15; 242/84.1 A; 242/106; 43/26.1
[58] Field of Search ................. 242/84.3, 84.1 A, 107; 43/15, 16, 21, 26.1

[56] References Cited

U.S. PATENT DOCUMENTS 1,360,429 11/1920 Michaelis ................................. 43/15
2,194,088 3/1940 Joabson ................................... 43/15
3,696,545 10/1972 Gudjonsson ............................. 43/15

Primary Examiner—Billy S. Taylor
Attorney, Agent, or Firm—Larson & Taylor

[57] ABSTRACT

An automatic fishing apparatus is disclosed which comprises a reel means mounted on a free clutch plate of a clutch assembly. A second clutch plate of the clutch assembly is provided on a driven shaft which also passes through the first plate. Two members are provided with bevelled surfaces one of the members having a rod which is moved when a fish takes a line coupled with the rod. Movement of the rod causes rotational movement of one of the members and also lateral movement of one of the members, which lateral movement is transmitted to the free clutch plate to force the free clutch plate against the driven clutch plate so that drive is transmitted to the free clutch plate and the reel means to reel in the line. Once the fish is reeled in the fish contacts the rod which causes the rod to move to return the said one of the members to its original position to separate the clutch plates to thereby stop the rotation of the reel means.

6 Claims, 3 Drawing Figures

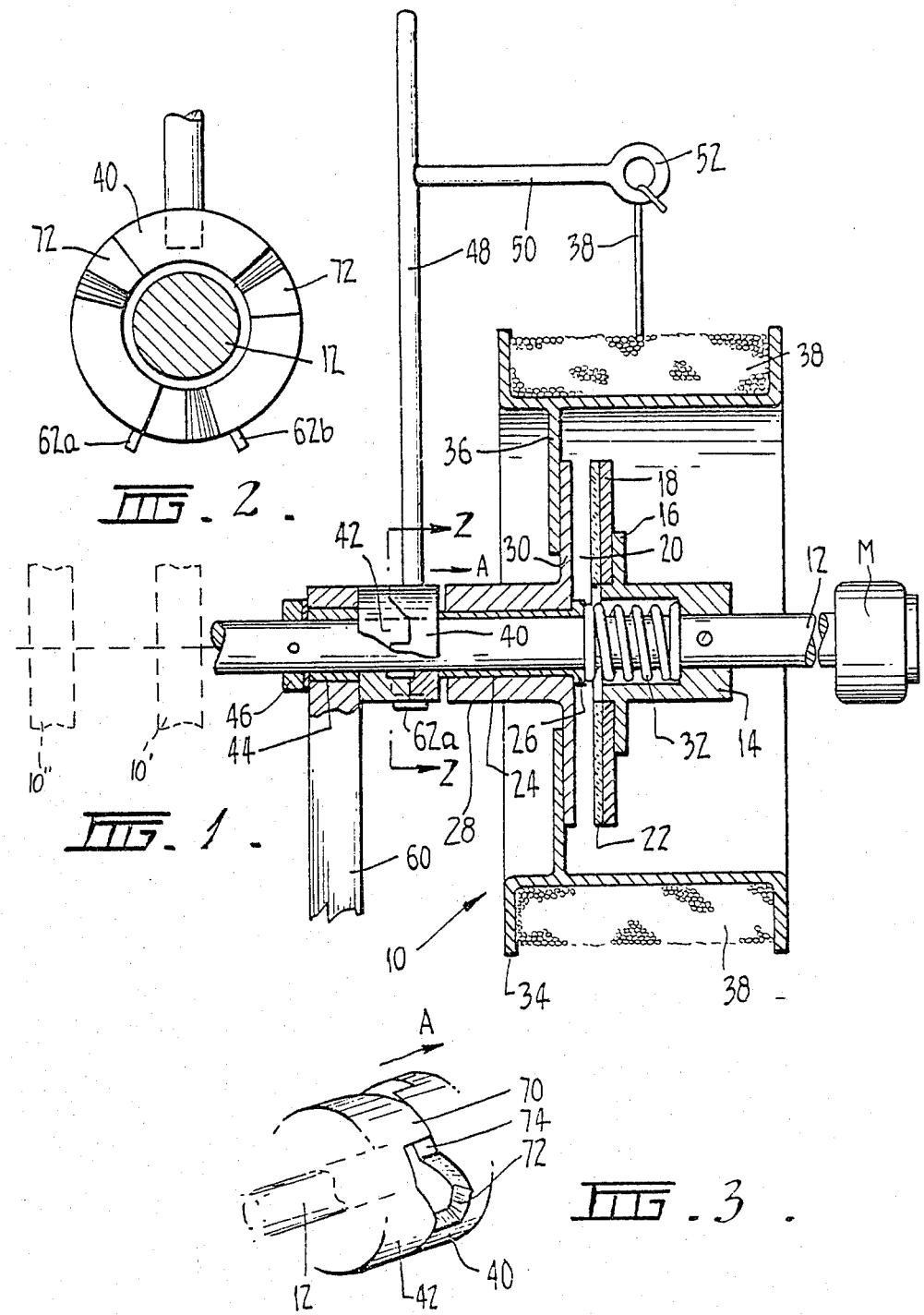

AUTOMATIC FISHING APPARATUS

This invention relates to automatic fishing apparatus and in particular to an automatic fishing line reel which may be used on fishing boats which tow shock lines.

It is still the practice on fishing boats for professional fishermen to obtain a substantial portion of their catch by the use of manual shock lines. Difficulties are often experienced when fishing for, for example, tuna using this method because tuna have an extremely soft jaw and unless they are reeled aboard within a short time after being hooked, they can break free of the hook. This is a particular problem when several lines are used simultaneously and only a few fishermen are present to operate the same.

It is an object of the present invention to provide an automatic fishing apparatus which will, once a fish is hooked, automatically reel in the fish.

The present invention provides an automatic fishing apparatus comprising a reel means for holding a fishing line, an actuating means for sensing when a fish has been hooked on said line and a driving means for causing said reel means to reel in the line upon actuation of said actuating means.

Preferably, the actuating means comprises a rod coupled to a rotatable member, said rotatable member having a bevelled surface which engages a corresponding surface on a fixed member, said rotatable member being coupled to a first clutch plate of a clutch, said first clutch plate being coupled to said reel means, a second clutch plate of said clutch being coupled to said driving means, said rod being engaged with said fishing line such that when a fish is hooked, said line causes said rod and said rotatable member to rotate such that the bevelled surface of said rotatable member causes lateral movement of said rotatable member which in turn causes said first clutch plate to be forced against said second clutch plate to impart drive to the first clutch plate and the reel means to thereby reel in the line.

A preferred embodiment of the present invention will be described with reference to the accompanying drawings in which:

FIG. 1 is a sectional view of an apparatus embodying the present invention,

FIG. 2 is a view along the line Z—Z of FIG. 1, and

FIG. 3 is a perspective view of part of the rotatable and fixed members.

Referring firstly to FIG. 1, an automatic fishing apparatus 10, comprises a driven shaft 12 driven by a motor M. The shaft 12 coupled to a U-shaped bush 14 which is pinned to the shaft 12 for rotation with the shaft 12. The bush 14 has a flange 16 upon which is mounted a clutch plate 18 of a clutch assembly 20. The clutch plate may be provided with a cork clutch lining 22.

The shaft 12 passes through a sleeve 24 having a front flange 26. A second bush 28 is mounted on sleeve 24 for relative rotation with the sleeve 24 such that rotation of shaft 12 is not imparted to the bush 28. The bush 28 includes a clutch plate 30 which may be integral with the bush 28 and which is normally spaced from the clutch plate 18 by means of a spring 32 which is provided in the hollow portion of the bush 14 and abuts against the end of the bush 14 and the flange 26 of sleeve 24. As is evident from FIG. 1, the shaft 12 passes through spring 32.

A reel means preferably in the form of a drum 34 is coupled to the outer side of clutch plate 30 by means of a connecting flange 36. The drum 34 contains a supply of fishing line 38.

Also supported about shaft 12 for rotation relative thereto is a rotatable member 40 and a fixed member 42 which is fixed relative to the structure on which the whole device is mounted so as not to be rotatable at all. The shaft 12 may be journalled in a bush and a collar 44 and 46.

The rotatable member 40 and the fixed member 42 have bevelled surfaces which in the position shown in FIG. 1 mesh together. The rotatable member 40 supports a rod or trip lever 48 which has a cross member 50 including a loop 52.

Referring to FIG. 3 which is a perspective view of the fixed and rotatable members 40 and 42, in the actuated position, as described above and as shown in FIG. 1, the members 40 and 42 are meshed together with projection 70 (FIG. 3) of fixed member 42 seated in cutout 72 of rotatable member 40. When rotatable member 40 rotates relative to fixed member 42, the projection 70 slides on surface 74 with the result that the member 40 is moved laterally as the projection leaves the cutout 72 and slides along the surface 74. A number of such cutout 72 and projection 70 are provided about the circumference of the members 40 and 42.

Fishing line from the drum 34 is passed out through the loop 52 and then into the sea. In this regard, it is envisaged that the apparatus 10 will be provided at the rear of a fishing boat and may be secured to the deck thereof by means of a tubular post 60. Indeed, as indicated schematically at 10' and 10'' in FIG. 1, it is envisaged that several such apparatuses will be mounted on the boat and possibly all provided on a single shaft 12.

In operation, once a fish is hooked on a line 38 the tension on the line will cause the rod 48 to be rotated out of the plane of FIG. 1 or to the right in FIG. 2. This rotation is imparted to the rotatable member 40 which rotates relative to the fixed member 42. Because of the bevelled surface of the rotatable and fixed members, rotation of the member 40 also causes a lateral movement of the rotatable member 40 in the direction of arrow A, (as discussed above). This lateral movement is transferred to the bush 28 and sleeve 24 which in turn move in the direction of arrow A against the bias of spring 32 until clutch plate 30 abuts against the driven clutch plate 18 which is rotating with the driven shaft 12.

Once the clutch plates 18 and 30 are together rotation of the shaft 12 is transmitted to the bush 28 and also to the drum 34 which causes the line 38 to be reeled onto the drum 34. When the hooked fish is reeled onto the boat it will abut the rod 48 in the vicinity of the loop 52. This together with the rotation of the drum 34 will cause the rod 48 to be rotated back into the plane of FIG. 1, or to the left in FIG. 2, to rotate the rotatable member 40 back into the position shown in FIG. 1. The bias of spring 32 will therefore separate the clutch plate and therefore stop the rotation of drum 34. The fish may then be taken from the line 38. The rotatable member 40 may include stops 62a and 62b to limit the rotation of the rod 48 in either direction.

An abutment (not shown) may be provided on post 60 so that after a certain amount of rotation the stop 62a or 62b on member 40 will abut the abutment to prevent further rotation.

Since modifications within the spirit and scope of the invention may readily be effected by persons skilled in the art, it is to be understood that this application is not limited to the particular embodiment described by way of example hereinbefore.

We claim:

1. Automatic fishing apparatus including:

reel means for holding a fishing line, a rotatable shaft supporting said reel means for selective rotation with or independent of said shaft;

driving means for driving said shaft continuously regardless of whether the reel means is selected to rotate with the shaft or independently thereof, and, actuating means for selectively coupling said reel means to the shaft for rotation therewith and for uncoupling said reel means from the shaft, said actuating means including a clutch assembly having clutch plates normally separated by a biassing member, said clutch plates including a driving clutch plate fixed for rotation with said shaft and a driven clutch plate mounted rotatably on said shaft and supporting said reel means and a line engaging member mounted pivotally on said shaft for movement from a first position to a second position as a result of a fish being hooked on said fishing line and causing increased line tension, said line engaging member having a hub portion arranged in operative abutting relationship with said driven clutch member and being associated with a cam assembly which, upon pivotal movement of said line engaging member from its said first position to its second position, causes said hub portion to move axially along said shaft and urge said driven clutch plate into engagement with said driving clutch plate to couple said reel means to said rotating shaft to reel in said fish, and once the fish is reeled in, said line engaging member being movable from the second position to the first position to uncouple the reel means from the shaft.

2. Automatic fishing apparatus according to claim 1, wherein said cam assembly having a cam face formed on said hub portion and a co-operating second cam face formed on a fixed member which is fixed against rotation with said shaft, said cam faces co-operating to cause said axial movement of said cam member as said line engaging member is pivoted about said shaft.

3. Automatic fishing apparatus according to claim 1, said cam assembly shaped to provide unhindered reversal of the movement which caused said axial movement of the hub portion, such that when said line engaging member moves from the second position to the first position by the hooked fish contacting the line engaging member the hooked fish forces the line engaging member back to said first position.

4. An assembly comprising a plurality of separate automatic fishing apparatus arranged in side by side relationship and each being as defined in claim 15 and wherein a common shaft constitutes the respective said rotatable drive shaft of said fishing apparatus.

5. Automatic fishing apparatus including:

reel means for holding a fishing line, a rotatable shaft supporting said reel means for selective rotation with or independent of said shaft;

driving means for driving said shaft continuously regardless of whether the reel means is selected to rotate with the shaft or independently thereof, and, actuating means for selectively coupling said reel means to the shaft for rotation therewith and for uncoupling said reel means from the shaft, said actuating means including a clutch assembly having clutch plates normally separated by a biassing member, said clutch plates including a driving clutch plate fixed for rotation with said shaft and a driven clutch plate mounted rotatably on said shaft and supporting said reel means and a line engaging member mounted on said shaft for movement from a first position to a second position as a result of a fish being hooked on said fishing line causing increased line tension, said line engaging member being associated with a cam member which, upon pivotal movement of said line engaging member from its said first position to its said second position, urges said clutch plates to their engaged attitude to couple said reel means to said rotating shaft to reel in said fish, and once the fish is reeled in said line engaging member is movable from the second position to the first position to uncouple the reel means from the shaft.

6. An assembly comprising a plurality of separate automatic fishing apparatus arranged in spaced apart side by side relationship upon a common shaft, each said fishing apparatus including reel means for holding a fishing line, said reel means being supported on said shaft for selective rotation with or independent of said shaft; driving means for driving said shaft continuously regardless of whether the reel means is selected to rotate with the shaft or independently thereof, and, actuating means for selectively coupling said reel means to the shaft for rotation therewith and for uncoupling said reel means from the shaft, said actuating means including a clutch assembly having clutch plates normally separated by a biassing member, said clutch plates including a driving clutch plate fixed for rotation with said shaft and a driven clutch plate mounted rotatably on said shaft and supporting said reel means and a line engaging member mounted on said shaft for movement from a first position to a second position as a result of a fish being hooked on said fishing line causing increased line tension, said line engaging member being associated with a cam member which, upon pivotal movement of said line engaging member from its said first position to its said second position, urges said clutch plates to their engaged attitude to couple said reel means to said rotating shaft to reel in said fish, and once the fish is reeled in said line engaging member is movable from the second position to the first position to uncouple the reel means from the shaft.

* * * * *

UNITED STATES PATENT AND TRADEMARK OFFICE
CERTIFICATE OF CORRECTION

PATENT NO. : 4,349,977
DATED : September 21, 1982
INVENTOR(S) : Brodribb et al

It is certified that error appears in the above—identified patent and that said Letters Patent are hereby corrected as shown below:

In Claim 4 at column 3, line 55, please change "Claim 15" to --Claim 1--

Signed and Sealed this

First Day of February 1983

[SEAL]

Attest:

GERALD J. MOSSINGHOFF

Attesting Officer

Commissioner of Patents and Trademarks